(12) United States Patent
Masuhara et al.

(10) Patent No.: US 6,300,041 B1
(45) Date of Patent: Oct. 9, 2001

(54) OPTICAL RECORDING MEDIUM AND MANUFACTURING METHOD THEREOF

(75) Inventors: Shin Masuhara; Masayoshi Kanno, both of Tokyo; Akitoshi Suzuki, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/551,506

(22) Filed: Apr. 17, 2000

Related U.S. Application Data

(62) Division of application No. 09/089,991, filed on Jun. 3, 1998, now Pat. No. 6,154,439.

(30) Foreign Application Priority Data

Jun. 10, 1997 (JP) .................................................... 9-152386

(51) Int. Cl.⁷ ...................................................... G11B 7/24
(52) U.S. Cl. ...................... 430/321; 430/945; 369/275.4; 369/275.3
(58) Field of Search ................................... 430/321, 320, 430/945; 369/275.3, 275.4

(56) References Cited

U.S. PATENT DOCUMENTS 5,220,556 * 6/1993 Shimizu ............................ 359/275.3
5,635,267 * 6/1997 Yamada et al. ...................... 369/288
5,923,640 * 7/1999 Takemura et al. ................. 369/275.4
6,154,439 * 11/2000 Masuhara et al. ................. 369/275.4

FOREIGN PATENT DOCUMENTS

| 0 768 648 | 4/1997 | (EP) . |
| 01-178145 * | 7/1989 | (JP) .................................. 369/275.4 |
| 05-182203 * | 7/1993 | (JP) .................................. 369/275.4 |
| 07-240027 * | 9/1995 | (JP) . |
| 08 022640 | 1/1996 | (JP) . |
| 08-096492 * | 4/1996 | (JP) . |
| 09-282715 * | 10/1997 | (JP) . |
| WO97/38420 | 10/1997 | (JP) . |

* cited by examiner

*Primary Examiner*—Martin Angebranndt
(74) *Attorney, Agent, or Firm*—Frommer Lawrence & Haug LLP.; William S. Frommer; Darren M. Simon

(57) ABSTRACT

An optical recording medium according to the present invention includes a data recording area forming a double spiral structured track having spiral recording tracks each formed of a groove and a land adjacent to the groove, and a reproduction only area forming a single spiral structured track consisting of a pit row.

3 Claims, 14 Drawing Sheets

OPTICAL RECORDING MEDIUM AND MANUFACTURING METHOD THEREOF

This is a divisional of Ser. No. 09/089,991, filed Jun. 3, 1998, now U.S. Pat. No. 6,154,439.

BACKGROUND

1. Field of the Invention

The present invention relates to an optical recording medium, particularly to one aiming for improvement and the like of recording density of a write-once or a rewritable type optical recording medium also having a reproduction-only recording area.

2. Background of the Invention

An optical disk which is one kind of the optical recording medium generally has a spiral shaped track at a predetermined pitch p (for example, p=0.7 to 1.6 $\mu$m ) in a signal recording area 2 on one surface (a signal surface) 4 of a substrate 3 made of optically transparent plastic as shown in FIG. 1A. The track consists of either continuous groove shaped concaves and convexes (groove 5 as a concave portion and land 6 as a convex portion) as shown in FIG. 1B or a pit row formed of continuous pits 8 as shown in FIG. 1C.

Of the optical disks, in an optical disk which makes it possible for a user to write in information (hereafter, referred to as a recordable optical disk) such as a write-once type and a rewritable type employing a phase change recording method or a magneto-optical recording method, what constitutes the main current is one which employs either the groove 5 or the land 6 in FIG. 1B as a recording area while employing the remaining one as a tracking light reflection area.

On the other hand, in the reproduction-only optical disk, what constitutes the main current is one in which the pit row where the pit 8 is continuous in FIG. 1C is employed simultaneously as a recording area and a tracking diffraction grating.

When information is to be recorded and reproduced, a laser light is irradiated from an optical pick-up (not shown) upon an opposite surface (read-out surface) 7 of the signal surface 4 while an optical disk 1 is rotated by the driving of a spindle motor (not shown).

Then, in a recordable optical disk, at a time of recording, information is written by its irradiating light in, for example, a record area on the land 6 as a mark which is equivalent to a pit in the reproduction-only disk, and at a time of reproducing, the written information is read out by a reflection light. Also, in order that the laser light for the recording and the reproduction is always irradiated on a predetermined track, tracking is carried out by detecting, for example, a reflecting light from the grooves 5 and the lands 6.

On the other hand, in the reproduction-only optical disk, read-out of the information and the tracking are respectively carried out by detecting a reflecting light and a diffraction light from the signal surface 4 on which the pit row 8 is formed.

Since the shape of such the track affects performance as a recording medium, it is demanded that the substrate 3 is most precisely manufactured. FIG. 2 illustrates a generally practiced manufacturing process of the substrate of an optical disk.

(1) Manufacture of a Master

Glass as a material for a master is worked to become a plate shape, its surface is ground sufficiently flat, washed and dried whereby a glass master 23 is manufactured.

(2) Painting of Photoresist

Photoresist, e.g., positive type resist which becomes soluble in alkali by exposure treatment 20 is painted about as thick as about 0.1 $\mu$m on the glass master 23 and the photoresist 20 is dried by carrying out heat treatment on the glass master 23.

(3) Recording by a Laser Beam (Cutting)

The photoresist 20 is exposed to light by condensing a recording laser light 31 by an objective lens 32 and irradiating it on the photoresist 20 on the glass master 23. In a case of the recordable optical disk, the irradiation is carried out continuously and in a case of the reproduction-only optical disk, the irradiation is carried out intermittently. Concurrently, an exposure spot is fed in a radius direction of the master 23 at a constant feeding pitch, i.e., at an equal distance per one rotation while rotating the glass master 23 in a circumferential direction. As a result, in the case of the recordable optical disk, a latent image for a track consisting of a groove in a spiral shape at a constant interval is generated in the photoresist 20 whereas in the case of the reproduction-only optical disk, a latent image for a track consisting of spiral shaped pit rows at a constant interval is generated in the photoresist 20.

(4) Development

By developing the photoresist 20 in an alkaline developing solution, its exposure portion is removed. As a result, in the case of the recordable optical disk, a track pattern consisting of an alternation of a groove 25 and a land 26 in a spiral shape at a predetermined pitch is formed on the glass master 23. Also, in the reproduction-only optical disk, a track pattern consisting of continuous spiral shape pit rows 28 at a predetermined pitch is formed.

(5) Manufacture of a Stamper

By electroforming nickel on the glass master 23 and peeling off a formed nickel layer, a nickel master (stamper) 34 onto which the pattern on the glass master 23 is transferred is manufactured.

(6) Plastic Molding

By molding plastic as a material for the substrate of the optical disk through an injection molding method or the like using the stamper 34, an optical disk substrate 3 having the track consisting of the groove and the land or the pit row as shown in FIGS. 1A to 1C is manufactured. This substrate 3 is a replica of the glass master 23.

After the replica is manufactured, a recording film, a reflection film and the like (not shown) are formed on the signal surface 4 of the substrate 3 in the recordable optical disk, while in the reproduction-only optical disk, a reflecting film, a protection film and the like (not shown) are formed on the signal surface 4 of the substrate 3.

FIG. 3 shows a schema of whole the structure of an apparatus (a cutting machine) used for carrying out the cutting in the process in FIG. 2, and FIG. 4 shows detailed structure of its optical system. The cutting machine is formed of the following parts.

(1) Laser Apparatus 41 as a Light Source

As one example, a Kr ion laser apparatus with a wavelength of 413 nm is used.

(2) Recording Light Intensity Control Unit 42

An apparatus for eliminating instability of output from the light source to control the final recording light intensity for which a servo system employing an electro-optical crystal element (EO) 42a, an analyzer 42b, a photo-diode 42c, a recording light intensity control circuit 42d is used.

(3) Light Modulating Unit 43

This is an optical system provided with a light modulator 43a on an optical path formed of beam splitters BS1, BS2, and convex lenses L1 and L2. The light modulator 43 a is used to form a pit of a length corresponding to a voltage level of an electric record signal, and to convert the voltage level of the record signal to a light intensity. For example, when the voltage level of the record signal consists of 2 values such as "0" and "1", a passing light is made on and off. As the light modulator is required to have performance capable of being used in a band of several tens of MHz, usually, an EOM (electro-optic crystal element modulator) and an AOM (acousto-optic crystal element modulator) are used.

(4) Beam Expander Unit 44

This is an optical system to expand a diameter of a beam of a recording laser light and a spot diameter of a condensed light is adjusted by its enlargement factor (magnification).

(5) Objective Lens 45

This is an optical system which condenses and irradiates the recording laser beam upon the photoresist 20 on the glass master 23.

(6) A Turntable 46 for Holding and Rotating the Glass Master 23 in a circumferential direction.

(7) Feeding Mechanism (not shown)

This is a mechanism for feeding an exposure spot of the record laser beam in a radius direction of the glass master 23 by holding the beam expander unit 44 and the objective lens 45 on a shifting stationary plate and shifting the shifting stationary plate by a motor and the like in a radius direction of the master 23.

(8) Servo System

This is for maintaining a distance between the master 23 and the objective lens 45 constant in a direction perpendicular to the surface of the glass master 23, and usually, a focusing laser 47 with a wavelength to which the photoresist is not photosensitive 20 is used.

With the use of a cutting machine having such a construction, the latent image of a spiral groove (or a pit row) at a constant interval is, as mentioned before, generated on the photoresist 20 by feeding the exposure spot of the record laser beam at a predetermined feeding pitch in the radius direction of the master 23 while rotating the glass master 23.

An fundamental construction of the optical system in the cutting machine is illustrated in FIG. 3 and FIG. 4, but in a case of the recordable optical disk, it is necessary at a stage of a manufacturing process of the substrate to beforehand record an address signal and the like which will become a marker when a user writes information. As a method for that, there are provided such a method by which exposure for a pit of the address signal is carried out at a position other than the optical system for the exposure spot for the groove, and another method by which a latent image for a serpentine groove is generated by vibrating (wobbling) the exposure spot for the groove in a radius direction of the master and an optical system corresponding to them is added to the cutting machine.

FIG. 5 shows a schema of construction of a cutting machine having a two-beam optical system corresponding to the wobbling. There is provided another optical system (referred to as channel Ch-B) other than the optical system (referred to as channel Ch-A) shown in FIG. 3 and FIG. 4, wherein the quantity of light given to the Ch-A almost equals the quantity of light given to the Ch-B by setting the transmittance of a beam splitter BS1 in a latter stage of the analyzer 42b to about 50%. However, the transmittance of the beam splitter—BS1 can be set to other than 50% corresponding to a necessary quantity of light for each of the channels.

The Ch-B has entirely the same construction as the light modulating unit 43 in the Ch-A as far as the light modulating unit is concerned, and by making an electric recording signal supplied to the light modulator 43a in the (Ch-A) and an electric recording signal supplied to the modulator 43a' in the Ch-B different, recording laser lights corresponding to different patterns (for example, the group in the Ch-A, the pit in the Ch-B) can be obtained.

On the optical path in the Ch-B, is provided a light deflector 51 such as an AOD (acousto-optical deflector) and the like, and depending on an electric signal inputted to the light deflector 51, the optical axis direction of the recording laser light in a direction of a light axis slightly oscillates within one plane. As a result, the exposure spot oscillates on the glass master 23. Further, according to a present format of an optical disk, as the wobbling is supposed to be carried out in a radius direction of the master, the light deflector 51 is so disposed that the exposure spot oscillates in a radius direction of the master 23 as shown in FIG. 6.

The optical axis of the recording laser light in the Ch-B is aligned with that of the recording laser light in the Ch-A by a polarizing beam splitter PBS through a light splitter BS3. Here, as a laser light is emitted from the laser apparatus 41 in a state of a linearly polarized beam, the recording laser lights at both channels before the polarized beam splitter PBS become the linearly polarized light of the same direction. As the polarized beam splitter let pass a linearly polarized light of a certain direction 100% but reflects the linearly polarized be am perpendicular to that direction 100%, in order for the recording laser lights at both the channels to reach the glass master 23 with maximum quantity of light, the linearly polarized light of one channel is sufficient to be rotated by 90 degrees.

Then, for example, in the Ch-A, half-wave plate 52 is provided at a front station of the polarized light splitter PBS, and the polarized light splitter PBS lets pass 100% the recording laser light in the Ch-A, wherein the direction of the linearly polarized light is rotated by 90 degrees by the half-wave plate 52, and makes the same incident on the light expander unit 44 while the linearly polarized light splitter PBS reflects the recording laser light in the Ch-B 100% and makes the same incident on the light expander unit 44.

Also, as the half-wave plate rotates direction of the linearly polarized light which is incident thereon at an incident angle of $\theta$ relative to a direction of a crystallographic axis within the plate surface by angle of $2\theta$, if the incidence angle of the recording laser light in the Ch-A on half-wave plate 52 is adjusted to change a rotating angle in a direction of the linearly polarized light, because the transmittance of the recording laser light in the Ch-A in the polarized light splitter PBS varies from 0% to 100% a ratio between the quantities of light of the recording laser lights in both the channels can finally be adjusted.

The recording laser lights in both the channels, which have passed through the light expander unit 44 are condensed by the objective lens 45 and subjects the photoresist on the glass master 23 to the exposure. The exposure spots of both the channels are spaced apart by a minute distance in a radius direction of the glass master 23 (generally within one half a pitch of the track, that is, as much as about 1 $\mu$m at the maximum). An adjustment to the end is carried out by giving the polarized light splitter PBS "a swing angle" so that a reflection angle of the recording laser light in the Ch-B at the polarized light splitter varies on the radius direction of the glass master 23 from a state in which the optical axes of the recording laser lights in both the channels completely coincide. As the exposure spot of the recording laser light in the Ch-B moves in the radius direction on the glass master 23 by the change in the reflection angle in the same manner as in the case of the wobbling shown in FIG. 6, the exposure spots in both the channels are spaced apart.

Next, a track format of the optical disk substrate will be described. In the past, "a single spiral structure" forming one-line spiral shaped recording track T as shown in FIG. 7A has been employed, but, recently various kinds of formats have newly been proposed in order to aim for high density of a recordable optical disk. One of them is a double spiral structure as shown in FIG. 7B to form 2-line spiral shaped recording tracks Ta and Tb.

As the double track structure has a fault in that jumping from either of the recording tracks Ta or Tb to another must be carried out in order to access all of recorded positions on the tracks, it is a format to be employed in case its merit in improving the record density far outweighs its fault.

There are following two kinds of method to form the double spiral structure.

As a first method, there is a method in which a feed pitch of the exposure spot at the time of cutting is set twice as many as the track pitch p to 2p to use both the groove and the land as an record area (called as a land/group record method). Generally, the width of each of the groove and the land is set to p each.

The first method effectively makes use of an area which has in the past been used only as a tracking guide groove out of the land and the groove to improve the record density and is thought to be the most reliable method for the high densification of a future optical disk.

As a second method, there is a method in which two spots away by the track pitch p in a radius direction are subjected to the exposure and its feed pitch is set two times the track pitch p to 2p at the time of the cutting (called "a 2 spot exposure method").

As a representative example for this method, there is "an intermittent wobbling method" which the applicant of the present invention proposes (U.S. patent application Ser. No. 08/823,879). This method is applied by modifying the form of the wobbling for recording the above-mentioned address signal and the like, in which, as shown in FIG. 8, assuming that one of the tracks Ta and Tb (Tb in the drawing) is made as a wobble track, its exposure spot (spot B) is vibrated while in the remaining track (Ta in the drawing), its exposure spot (spot A) is normally let to advance straightforward.

There is a problem with the normal wobbling in that, as the track pitch is made narrower, leakage (cross talk) record signals between adjoining tracks becomes larger, thereby making it difficult to read out the signal correctly. However, according to the intermittent wobbling method, because a wobbled track exists only at every other line, it is possible to sufficiently prevent the cross talk and correctly read out a signal even in a case the track pitch is narrow. This method is scheduled to be employed by the second generation MD-DATA, which is a kind of mini-disk.

The 2 spot exposure method is carried out, using by a cutting machine having a 2 light optical system as shown in FIG. 5.

By the way, the double spiral structure mentioned above is a track format proposed to aim for the high densification of the record area in the recordable optical disk and presupposes to have only a data record area consisting of the groove and the land.

In contrast to this, it is general for optical record media of various kinds including, for example, an optical disk to beforehand record inherent information concerning a format, and also, in addition to the beforehand recorded information of the various kinds, there exists an optical disk (is called a "partial ROM") in which a user can write information later, but no optical disk with a track format suitable for these has ever been proposed yet.

SUMMARY OF THE INVENTION

In view of such aspects, it is an object of the present invention to propose a way to beforehand record an inherent information concerning a format, an optical record media with a track format suited for the partial ROM, its manufacturing method and the like.

An optical recording medium according to the present invention includes together a data recording area forming a track of a double spiral structure consisting of a groove and a land, and a reproduction only area forming a single spiral structure consisting of a pit row.

According to the optical recording medium, as there exists the reproduction only area with the single spiral structure consisting of the pit row other than the data recording area, it becomes possible to beforehand record inherent information concerning a format and other information of various kinds.

A manufacturing method of the optical recording medium is according to the present invention, in a manufacturing method for an optical recording medium comprising; a process for forming photosensitive layer on a master; a cutting process for forming a latent image of a track by subjecting the photosensitive layer to exposure; a process for forming a track pattern on the master by developing the photosensitive layer; and a process for molding a substrate of an optical recording medium having the same pattern as this pattern, is characterized in that in the cutting process, the latent image of the track having a double spiral structure in the data recording area is formed by an exposure spot at a predetermined feed pitch while a latent image of a the track in a reproduction only area having single spiral structure is formed by an exposure spot at a narrower feed pitch than the predetermined feed pitch.

According to the manufacturing method, because the feed pitch of the exposure spot for forming the latent image the track having single spiral structure in the reproduction only area is made narrower than the feed pitch for forming the latent image of the track having the double spiral structure of the data recording area, the track pitch in the reproduction only area becomes narrower than 2p (that is, becomes narrower than twice the track pitch p in the data recording area. As a result, it becomes possible to manufacture an optical recording medium wherein the recording densities of the data recording area and the reproduction only area are respectively improved without being subjected to restrictions by the mutual formats.

DESCRIPTION OF THE PREFERRED EMBODIMENTS

Hereafter, an embodiment according to the present invention will be described with reference to the accompanying drawings.

Figure 1A:
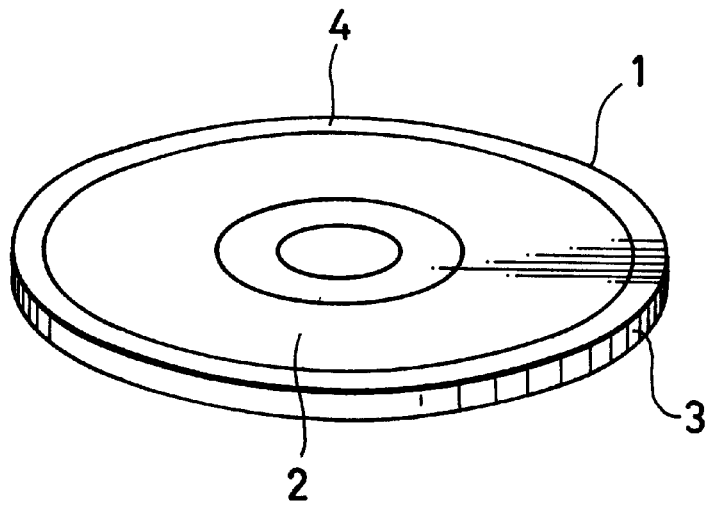
FIGS. 1A to 1C are perspective views showing an example of a structure of an optical disk.
Figure 1B:
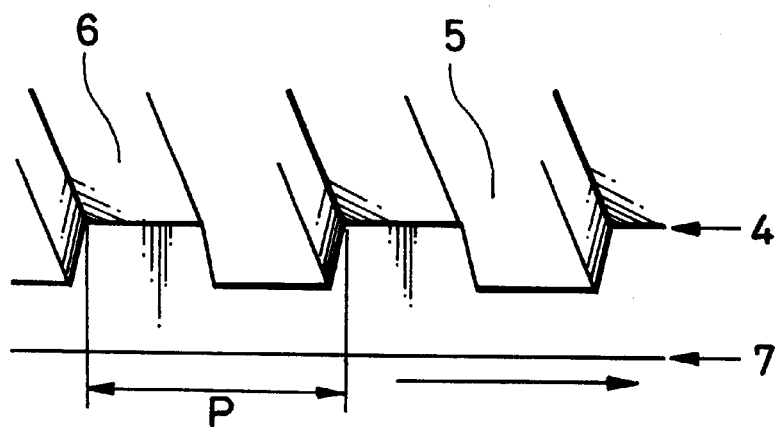
Figure 1C:
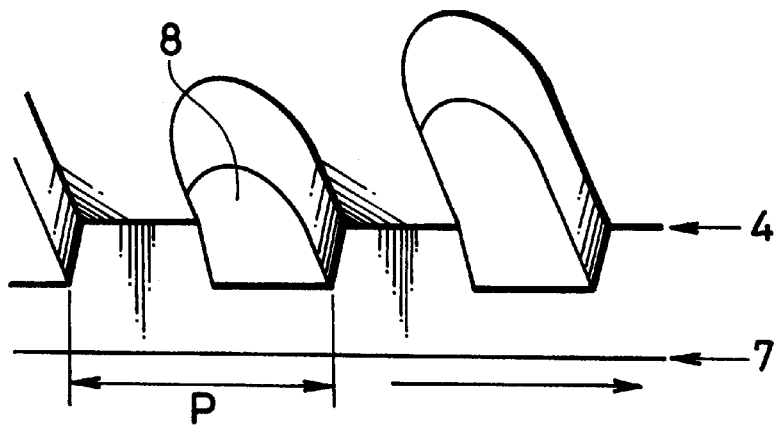
Figure 2:
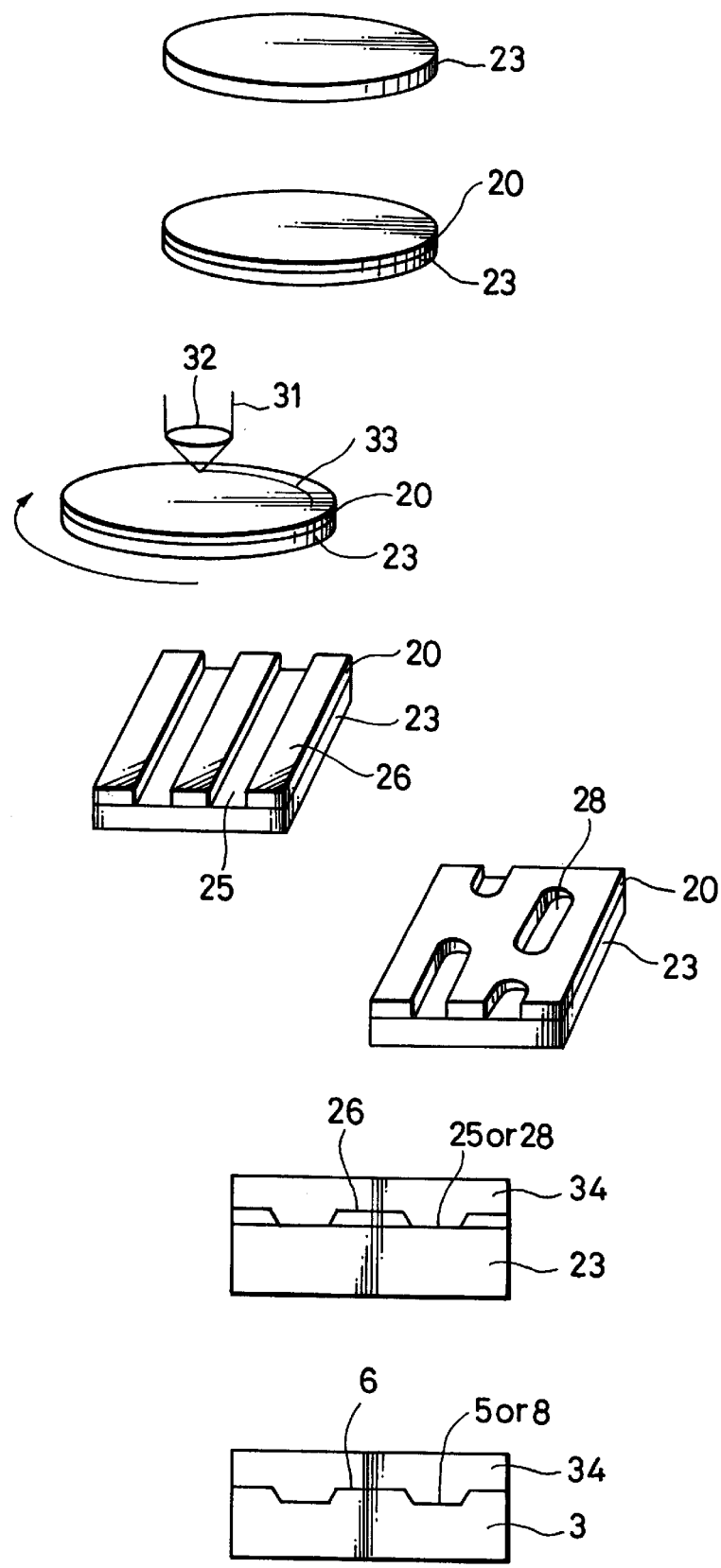
FIG. 2 is a diagram showing one example of a process for manufacturing a substrate of the optical disk.
Figure 3:
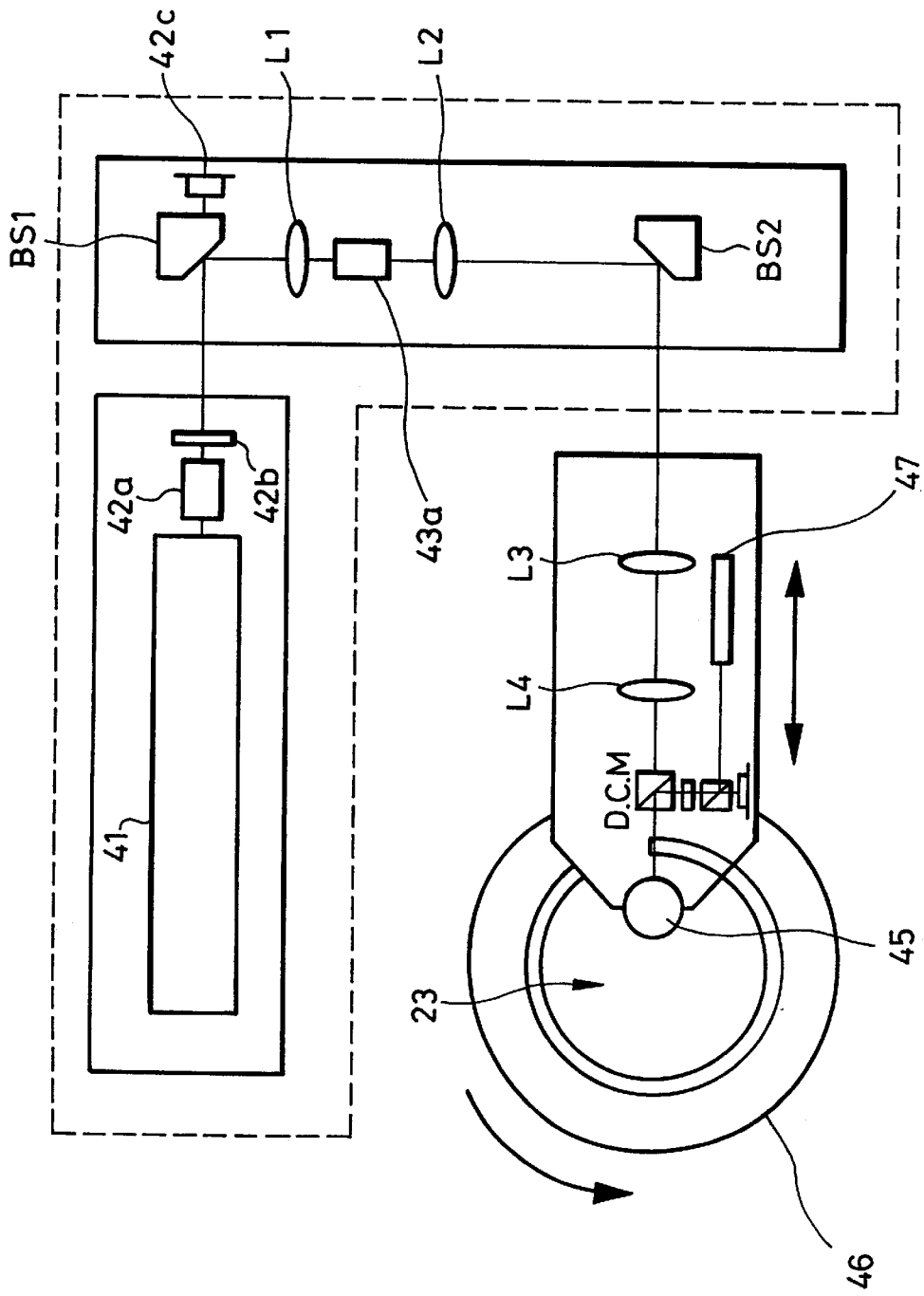
FIG. 3 is a diagram showing one example of a structure of the cutting machine.
Figure 4:
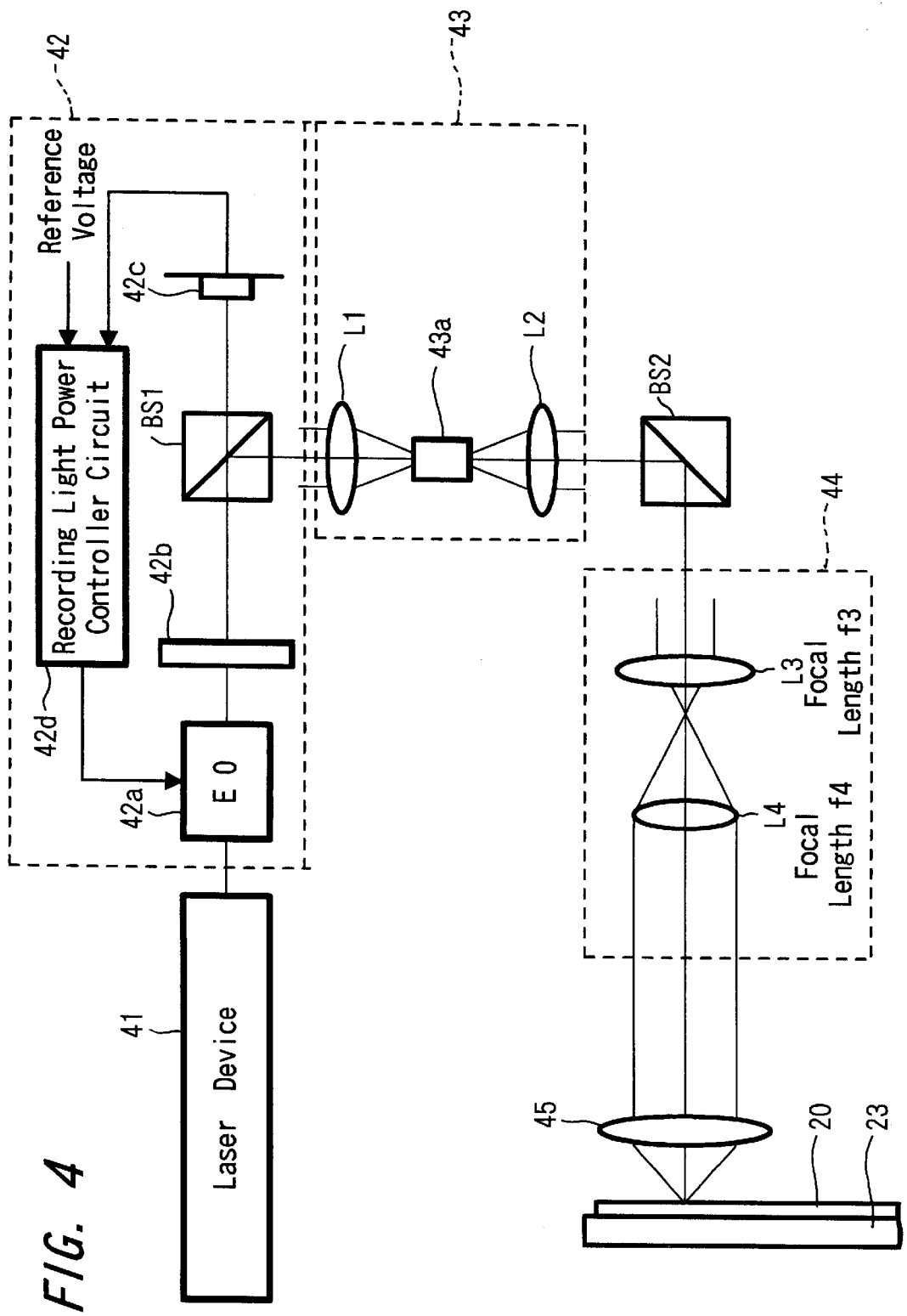
FIG. 4 is a block diagram showing one example of an optical system of the cutting machine in FIG. 3.
Figure 5:
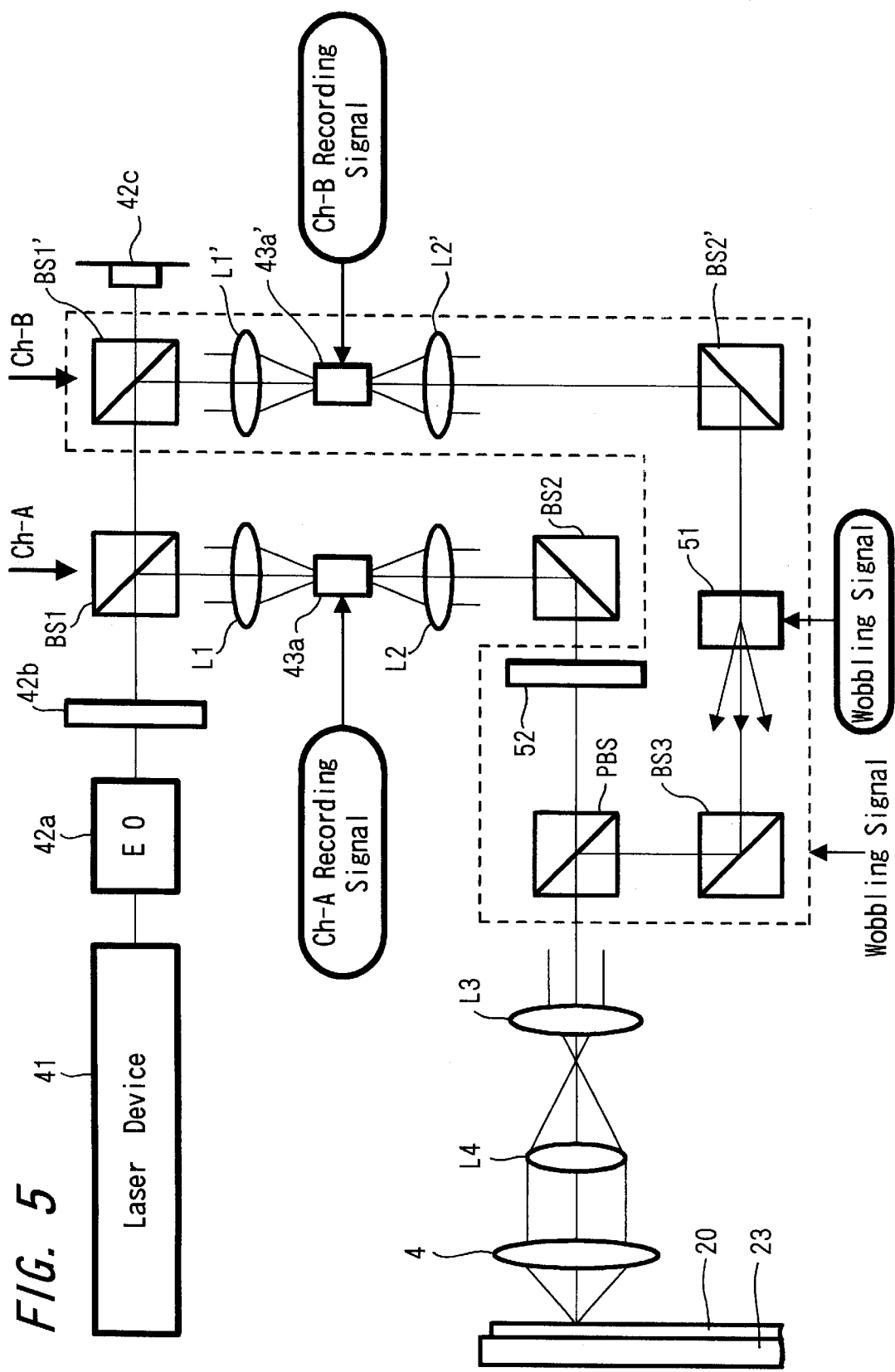
FIG. 5 is a block diagram showing one example of the structure of the cutting machine.
Figure 6:
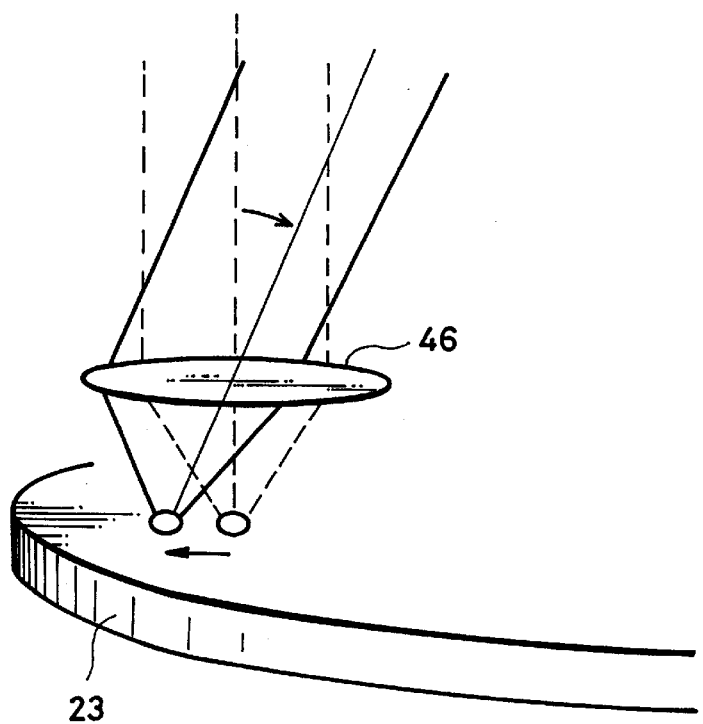
FIG. 6 is a perspective view showing one example of wobbling.
Figures 7A, 7B:
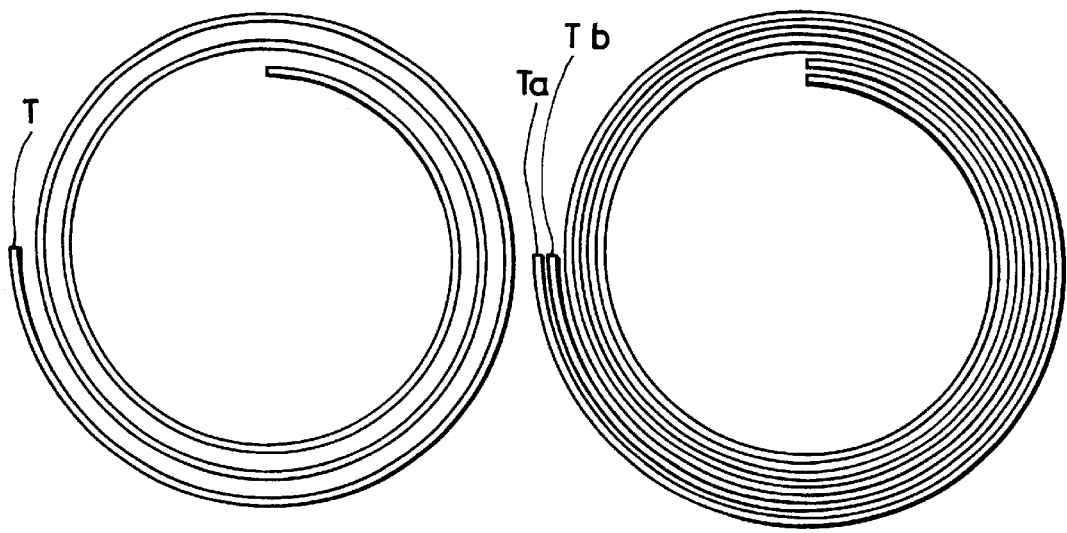
FIGS. 7A and 7B are diagrams showing an example of a track format of a conventional optical disk.
Figure 8:
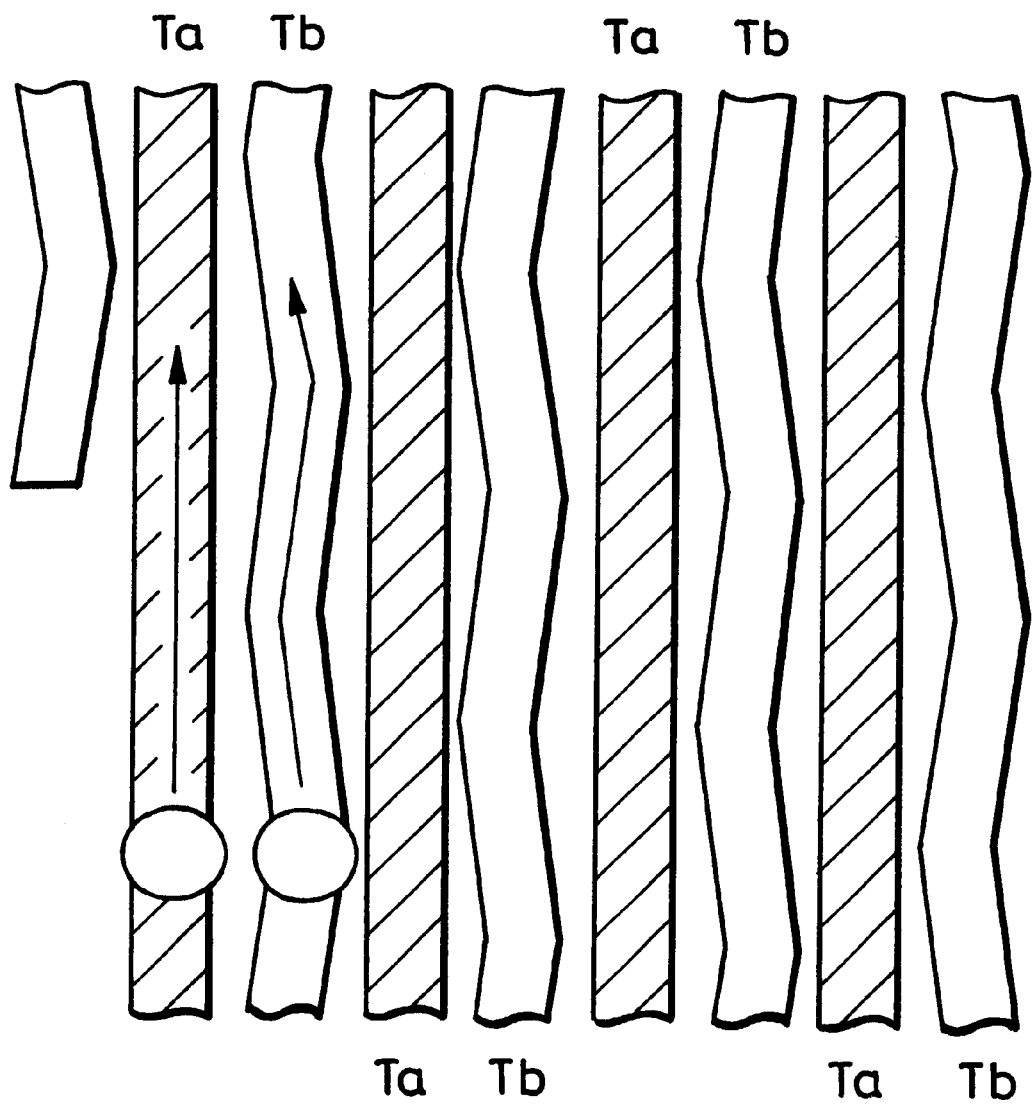
FIG. 8 is a diagram showing one example of intermittent wobbling system.
Figure 9:
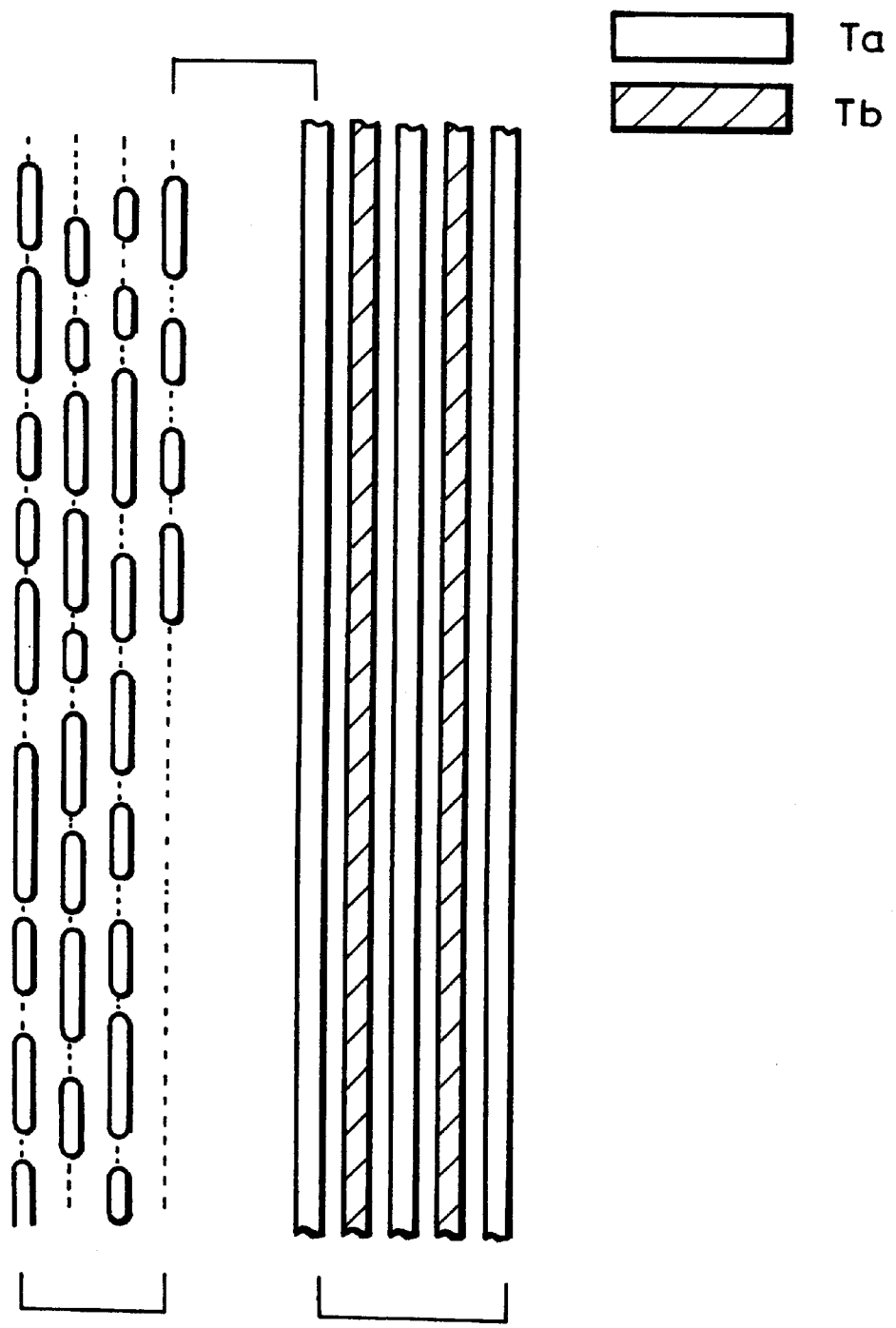
FIG. 9 is a diagram showing one example of a track format of an optical disk according to the present invention.
Figure 10:
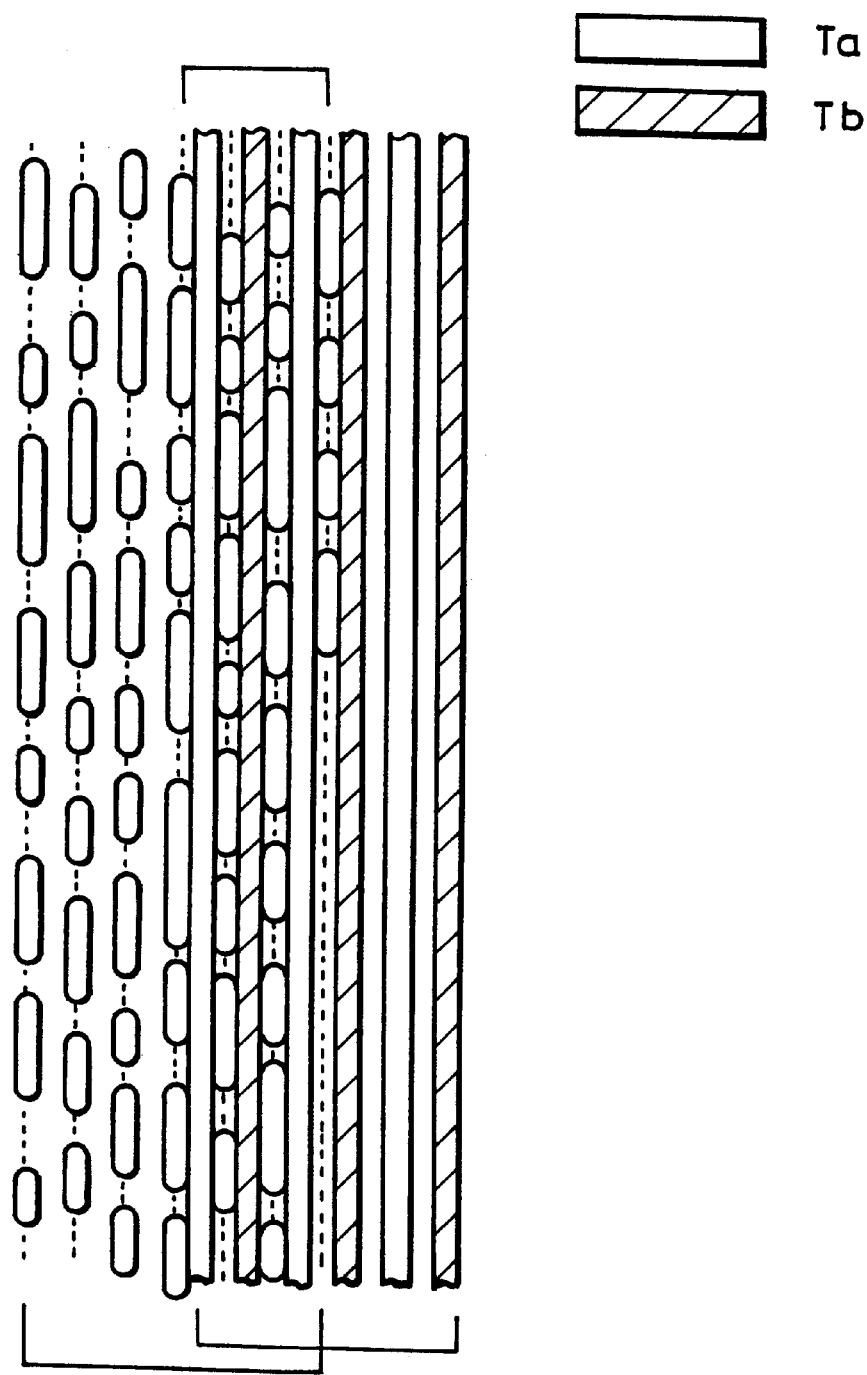
FIG. 10 is a diagram showing another example of a track format of an optical disk according to the present invention.
Figure 11:
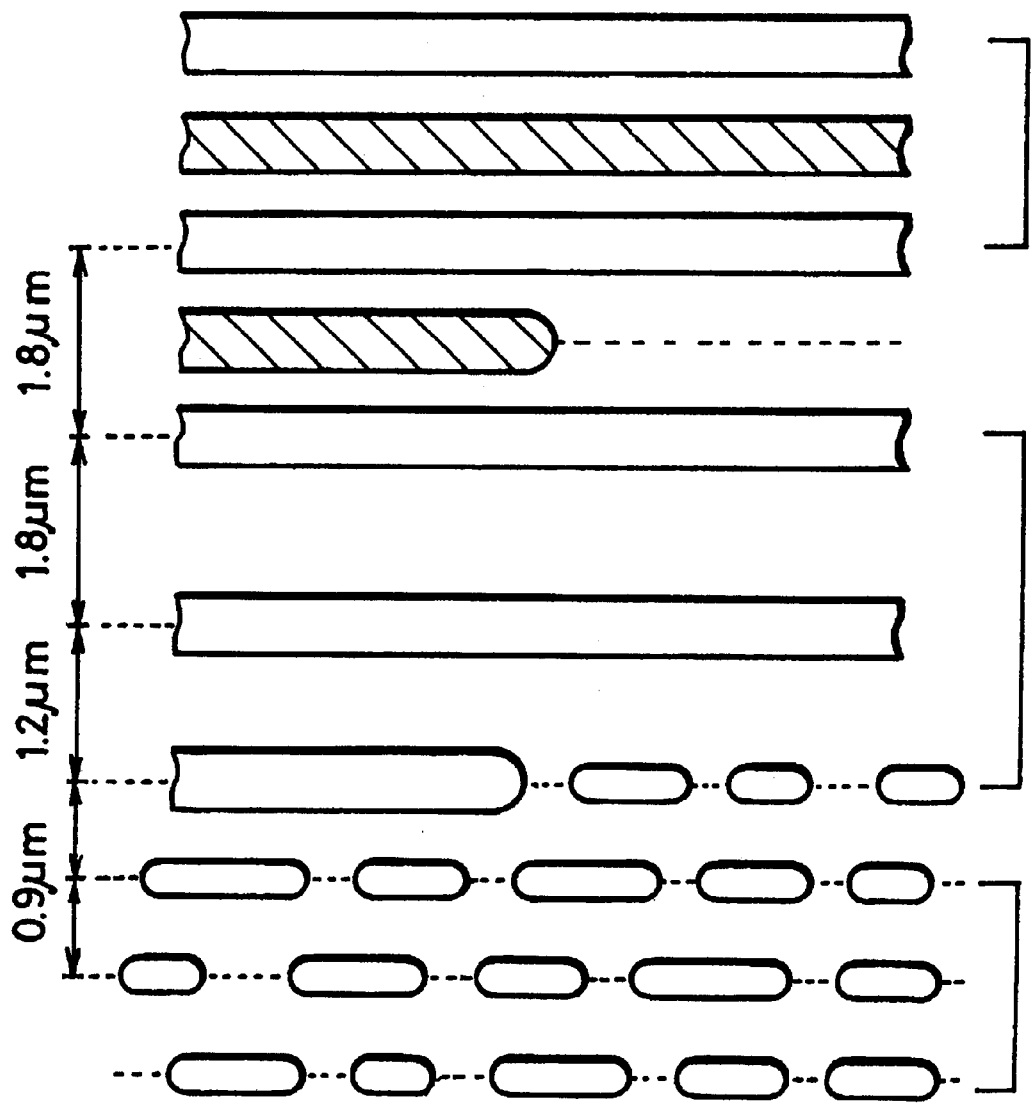
FIG. 11 is a diagram showing a further example of a track format of an optical disk according to the present invention.

FIG. 9 to FIG. 11 respectively show examples of track formats of optical disks simultaneously having a data recording area forming a track of a double spiral structure consisting of a groove and a land, and a reproduction only area forming a track of a single spiral structure consisting of a pit row. As shown in FIGS. 9 to 11, tracks Ta, Tb are groove-structured tracks, and a land portion is formed between the tracks Ta and Tb. It is possible to employ an optical disk according to another embodiment allowing land/groove recording in which the track Ta is formed of the groove and the track Tb is formed of the land, particularly, in correspondence with the structure shown in FIGS. 5 and 7A, 7B.

The following will be reason why the reproduction only area is of a single spiral structure.

On the premise that continuous exposure (without stopping at any moment the feed action by a feed mechanism as well as the rotational action by a turn table, and never allowing them to carry out a discontinuous operation) is carried out like the present cutting method, as a cutting method for providing the reproduction only area other than the data recording area, the following method will be conceivable.

1 A method to carry out the cutting by one exposure spot in the reproduction only area.

This will be divided into the following 2 ways.

Figure 12:
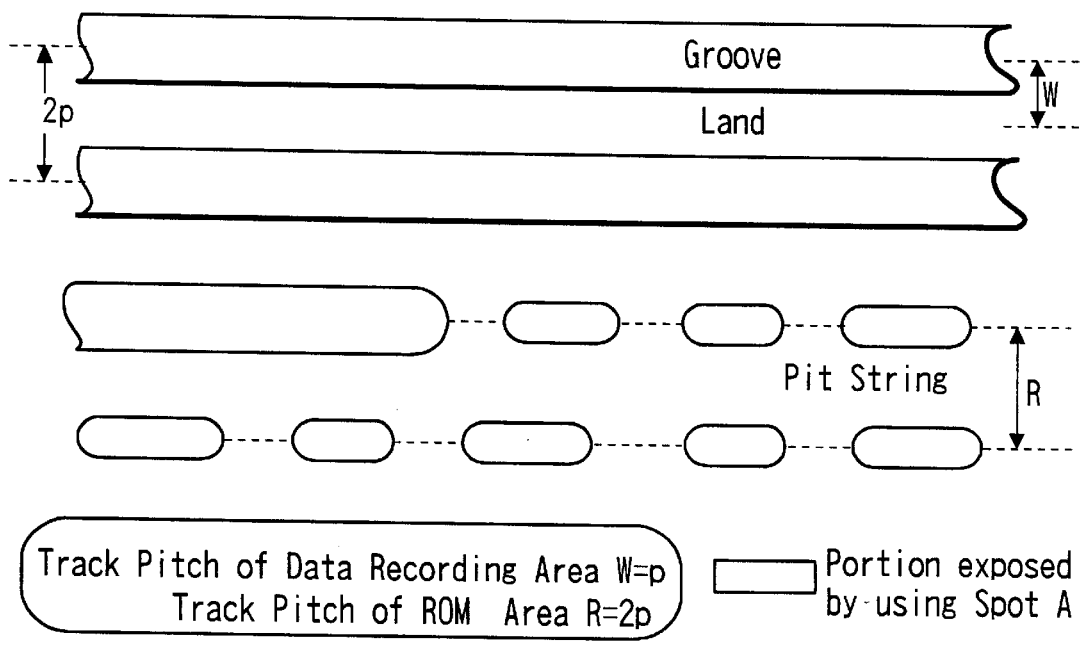
FIG. 12 is a diagram showing one example of the cutting method according to the present invention.

A first method is such one that as shown in FIG. 12, in a case a latent image of a track having a double spiral structure in a data recording area is formed by a land/groove recording method, a spot A, which has formed a latent image on a groove in a data recording area is used as it is for forming a latent image of a track in a reproduction only area (ROM area).

Figure 13:
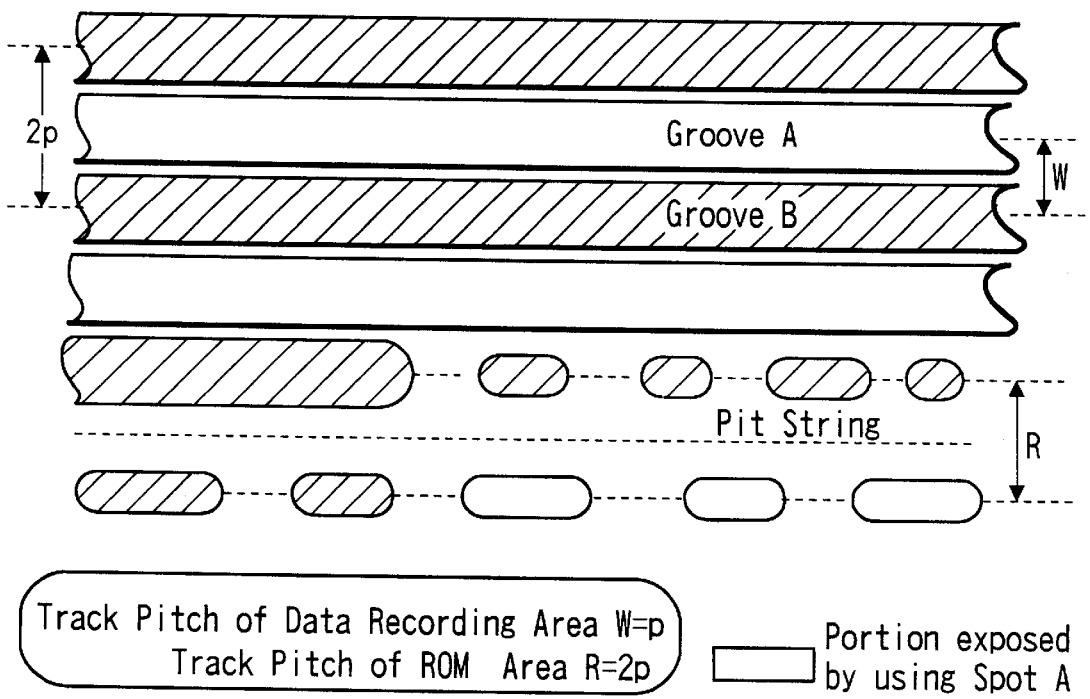
FIG. 13 is a diagram showing another example of the cutting method according to the present invention.

A second method is such one that as shown in FIG. 13, in a case the latent image of the track having the double spiral structure in the data recording area is formed by the 2 spot exposure method, one spot (spot B in the figure) out of 2 spots A and B is used to form the latent image of the track in the reproduction only area.

In these methods, the track in the reproduction only area is of a single spiral structure.

2 A method for carrying out the cutting by 2 exposure spots.

This will be divided into the following 2 ways.

Figure 14:
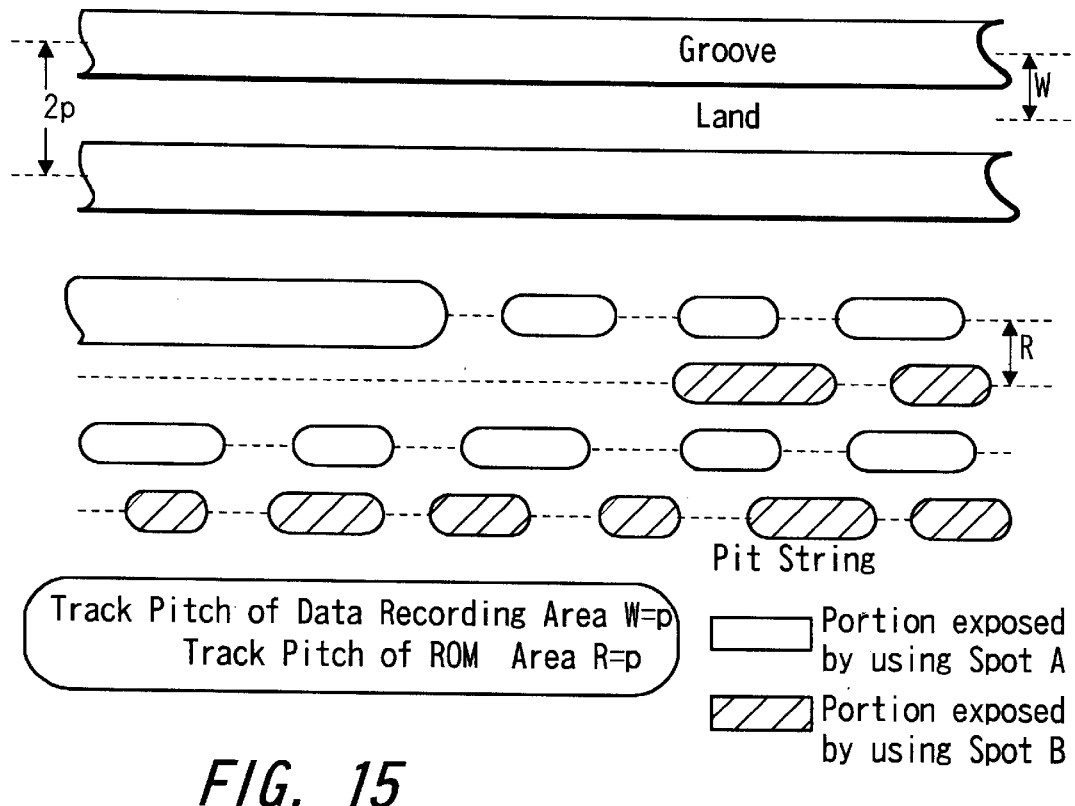
FIG. 14 is a diagram showing another example of the cutting method for providing a reproduction only area other than a data recording area.

A first method is such one that as shown in FIG. 14, in a case the latent image of the track having the double spiral composition in the data recording area is formed by the land/groove recording method, another spot B away in a radius direction from the spot A by a distance p relative to a feed pitch 2p is added for use in order to form the latent image of the track in the reproduction only area.

Figure 15:
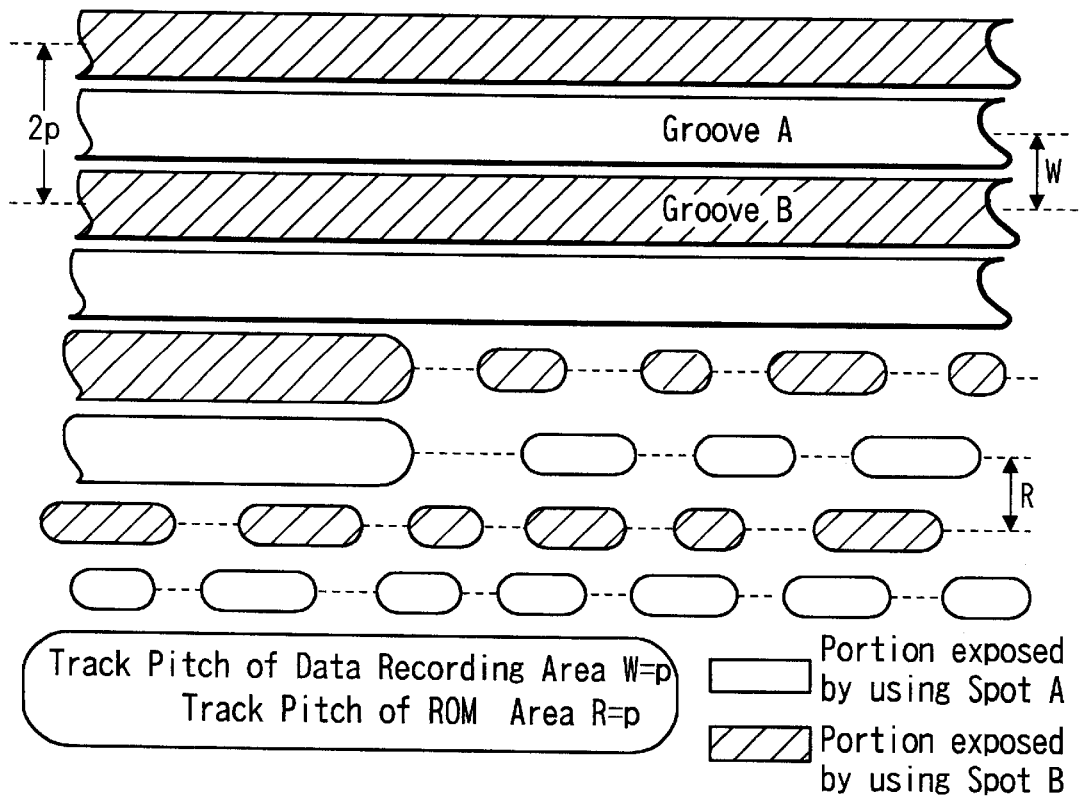
FIG. 15 is a diagram showing another example of the cutting methods for providing a reproduction only area other than a data recording area.

A second method is such that as shown in FIG. 15, in a case the latent image of the track having the double spiral structure in the data recording area is formed by the 2 spot exposure method, the spots A, B are used as they are for forming the latent image of the track in the reproduction only area.

In these methods, the track in the reproduction only area is of the double spiral structure.

The fact that the track in the reproduction only area is made of double spiral structure has a defect in that, as mentioned before, the track jumping has to be carried out, and further, unlike the data recording area, the merit of the improved recording density does not outweigh the defect in a case of the reproduction only area. Also, other than the defect, there are other defects; one being that it takes time because a record signal to the reproduction only area has to be divided into 2 signals for 2 exposure spots (that is, for 2 channels) from one master; and the other being that as the 2 exposure spots pass through different optical paths in the cutting machine, it is considerably difficult to obtain equal reproduction signals from pit rows exposed to the light by the exposure spots (the exposure for forming a pit sensitively reflects the forms of the spots in a tangent direction to the track when compared with the exposure for forming a groove, therefore, its control is difficult).

Further, as a more serious problem, there is a problem of interchangeability with a track format of a reproduction only recording medium which a recording and reproduction apparatus of a recordable optical disk and other optical recording media supports. The track format of the reproduction only recording media in such a recording and reproducing apparatus is of single spiral composition and therefore, if the reproduction only area is made to be of the double spiral structure, its design becomes burdensome because a counter-measure has to be contemplated how to cope with such problems as the track jumping and the tracking servo in the design of the recording and reproducing apparatus.

On account of such reasons, the reproduction only area is made to be of the single spiral structure. As a result, simplification of the system of the recording and reproducing apparatus, recording work in the reproduction only area and improvement of accuracy of a reproduction signal from the reproduction only area can be realized.

Next, the disk according to the present invention is, in an optical recording medium comprising the data recording area forming the double spiral structured track consisting of a groove and a lane; and the reproduction only area forming the single spiral structured track consisting of a pit row, characterized in that a track pitch in the reproduction only area is narrower than twice a track pitch in the data recording area.

The following are reasons why the track pitch in the reproduction only area is made narrower than twice the track pitch in the data recording area.

When the reproduction only area is made to be of single spiral structure by the above-mentioned first and second methods as shown in FIG. 12 and FIG. 13, the feed pitch becomes 2p relative to the track pitch p in the data recording area of the double spiral structure, so the track pitch in the reproduction only area becomes 2p (that is, twice the track pitch p in the data recording area). Therefore, the recording density in the recording only area becomes lower than a technological limit.

If it is only to beforehand record inherent information concerning a format, such a decrease in the recording density does not pose any problem as a recording capacity of the reproduction only area can be negligibly small. But in the case of the partial R0M, a decrease in the recording density of the reproduction only area is a serious problem.

Also, when compared in terms of the same recording density, a recording signal to the reproduction only area, is not coincident with a recording signal to the data recording area (a phase change signal or a magneto-optical signal) in a signal characteristic (a skew margin and the like). Therefore, it is unnecessary that the recording density of the reproduction only area is made the same as that of the data recording area. There is no existence of any reason that at least the track pitch in the reproduction only area must be two times or larger as wide as that of the data recording area.

On account of such reasons, the track pitch in the reproduction only area is set to being narrower than twice the track pitch in the data recording area. As a result, it becomes possible to improve the recording densities of both the data recording area and the reproduction only area without being subjected to restrictions by the mutual formats.

Also, as an example, the track pitch in the reproduction only area is preferably made to coincide with a track pitch in a track format of a reproduction only recording medium supported by a specified drive intended to practically drive an optical recording medium. By so doing, interchangeability with the reproduction only recording medium driven by that drive can easily be maintained.

Of these, in a case of the above optical disk employing the data recording area and the reproduction-only area shown in FIG. 9, the data recording area and the reproduction only area (R0M area) are separated by an area where a track is not formed (is called a no signal surface or mirror surface).

In an example of FIG. 10, there exists an area where the data recording area and the reproduction only area are partially overlapped (the area wherein a track T in the recording only area is sandwiched between tracks Ta and track Tb in the data recording area).

These track formats are realized by separately cutting the data recording area and the reproduction only area independently of each other at the time of cutting.

That is, if a range of a recording radius Rr which the reproduction only area occupies on an optical disk is set to r1≦Rr≦r2 and a range of a recording radius R w which the data recording area occupies is set to r3≦Rw≦r4, in the case of FIG. 9, by setting r2<r3 and in the case of FIG. 10, by setting r2>r3, the data recording area and the reproduction only area have to be respectively subjected to the cutting.

Here, the larger an absolute value of a difference between r2 and r3 is (that is, the larger the no signal surface in FIG. 9 and an overlapping area in FIG. 10 are) the more loss of the recording capacity increases, so it is desirable that the value can be made as near zero as possible. This depends on a positioning accuracy of the exposure spot in a radius direction at a starting time and a finishing time of the cutting, but, as a machine of today has a positioning accuracy of up to 5 $\mu$m (to an extent of 10 tracks), loss of the recording capacity can be negligibly reduced.

Meanwhile, in the examples of FIG. 9 and FIG. 10, as the reproduction only area and the data recording area become perfectly discontinuous, even if a track in one area of the reproduction only area and the data recording area is followed directly a shift to a track in another area is not presented. Then, in order to reproduce recording signals of the whole areas from an optical disk having such a track format, there is a need for a method which makes possible the shift between the reproduction only area and the data recording area.

As to this method, for example, a method currently practiced for the shift between the reproduction only area and the data recording area in a recordable mini-disk is preferably used.

Figure 16:
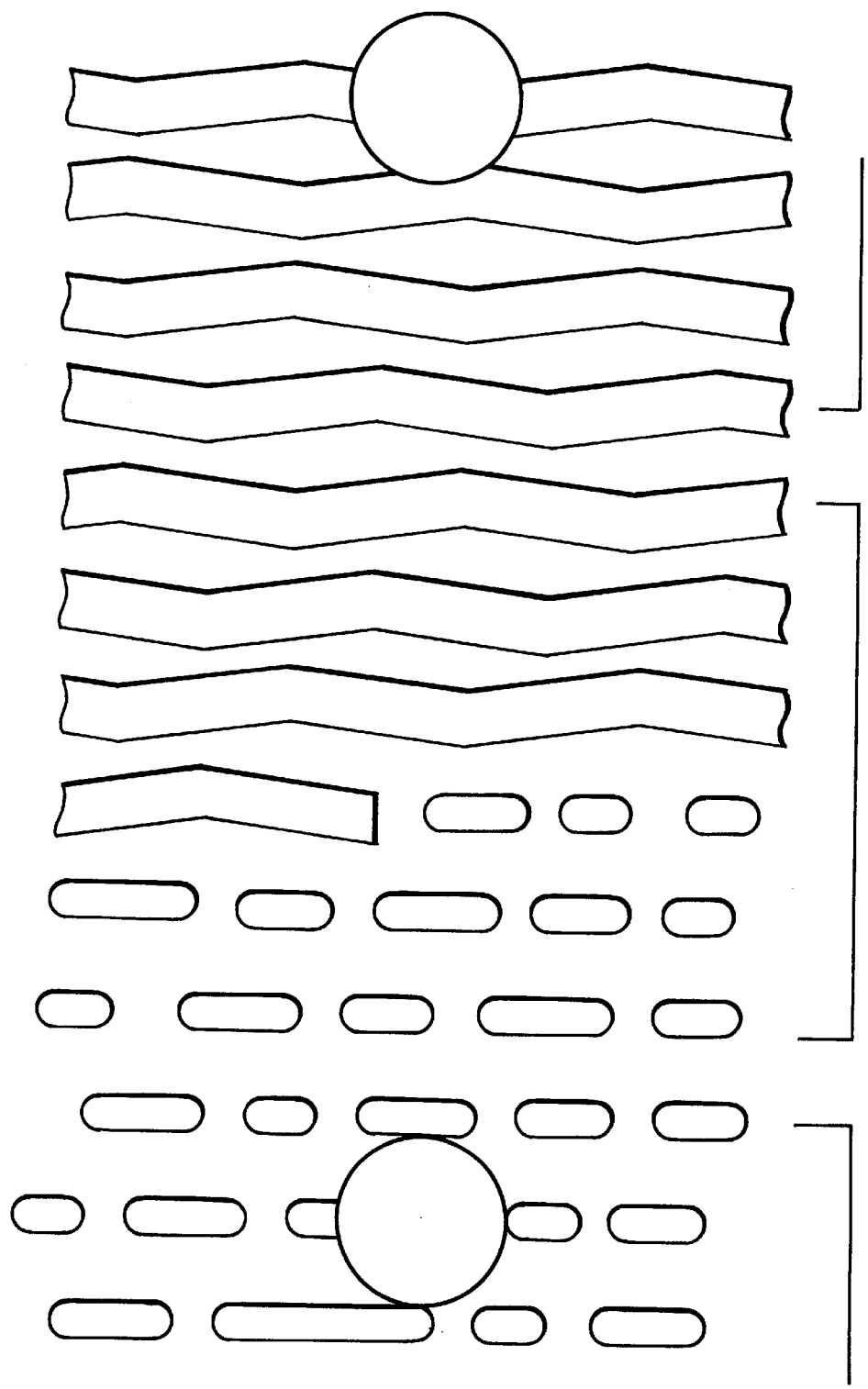
FIG. 16 is a diagram showing a method for shifting between the reproduction only area and the data recording area.

FIG. 16 is a drawing showing this method. First of all, several tracks in the neighborhood of a boundary between the reproduction only area and the data recording area are set to an area which is not used for recording and reproducing (referred to as a shift area or non-use area). Then, as indicated as ① in the same drawing, for example, at the time when the reproduction of a recording signal in the reproduction only area is finished, a reproduction spot is made to jump across the shift area to an appropriate position in the data recording area. At this time, a gain (depending on a case, polarity, too) of a tracking servo system is changed over between the reproduction only area and the data recording area. Next, as indicated as ② in the same drawing, based on an address signal (address information inserted by address bit or wobbling) of a track in the data recording area on which the reproduction spot has landed, a target address is searched for.

In order for an optical disk with a track format in FIG. 9 and FIG. 10 to utilize this method, it is enough that, an area equivalent to the summing of several tracks in front and in the rear of each of a no-signal surface in FIG. 9 and an overlapping area in FIG. 10 is set to the shift area.

Next, in an example of a format in FIG. 11, one track (here, Ta) out of tracks Ta and Tb in the data recording area is contiguous with a track T in the reproduction only area.

This track format can be realized, at a time of cutting, by changing a feed pitch of an exposure spot at a boundary portion between a part to form a latent image of a track in the data recording area and a part to form a latent image of a track in the above-mentioned reproduction only area.

That is, for example, in a case when a track pitch in the reproduction only area is set to 0.9 $\mu$m and a track pitch in the data recording area is set to 0.9 $\mu$m by adopting the land/groove recording method, first of all, after finishing the cutting at a feed pitch of 0.9 $\mu$m in the reproduction only area, the feed pitch is changed up to 1.8 $\mu$m, while the exposure spot is moving in the boundary portion (a shift area in FIG. 7) toward the data recording area.

Also, for example, in a case when the track pitch in the reproduction only area is set to 0.9 $\mu$m and the track pitch in the data recording area is set to 0.9 $\mu$m by adopting the 2 spots exposure method, first of all, after finishing cutting at a feed pitch of 0.9 μm in the reproduction only area, the feed pitch is changed up to 1.8 μm, while the exposure spot is moving in the boundary part toward the data recording area and when the exposure spot reaches the data recording area, another exposure spot is added apart by 0.9 μm away in a radius direction from the exposure spot. In the 2 examples mentioned above, it is also a matter of course that the feed pitch is preferably changed to 0.9 μm while the exposure spot is moving in the boundary portion toward the reproduction only area after the cutting is first of all finished at a feed pitch of 1.8 μm in the data recording area.

By the way, if the feed pitch is changed during the cutting, it naturally takes a little time before the feed pitch becomes stabilized. The feed mechanism of the present cutting machine employs an air slide method by a linear motor or an air static pressure screw method. In the air slide method, a result of an actual measurement of a required time was about $\frac{1}{15}$ sec. Therefore, if a number of revolution of a turntable of the cutting machine is set to 900 revolutions per minute (15 revolutions per minute), it is possible to stabilize the feed pitch at the changed pitch while the turntable revolves almost once. The revolution number of the turntable in the present cutting machine is, in general, in a range of 200~250 revolutions per minute, and therefore, as it is possible to stabilize the feed pitch while the turntable revolves three times at the maximum, it can be said that practically there is no problem.

Meanwhile, in a case of reproducing a record signal from the optical disk with a track format in FIG. 11, it is appropriate to let the exposure spot jump the track, as in FIG. 16, in the shift area between the reproduction only area and the data recording area. Its reason is that, first of all, the gain of the tracking servo system (depending on a case, even the polarity) can be changed over while carrying out the track jumping. Also, secondly, although there is a case wherein a signal is recorded first on the land in the land/groove recording method because it is possible to first shift to the land in the data recording area is followed as it is, by jumping the tracks, whereas if the track in the reproduction only area is followed as it is, the shift to the groove in the data recording area occurs,.

There are following advantages with the track format in FIG. 11 as compared with the track formats in FIG. 9 and FIG. 10.

(a) Even in a case of having landed by mistake on the shift area at a time of jumping the tracks, because there exists a groove in the shift area, it is possible to continuously shift to the groove in the data recording area as it is. Therefore, there is few risk for the exposure spot to move recklessly.

(b) As mentioned above, because the feed pitch after it was changed can be stabilized while the turntable revolves three times at the maximum, the width of the shift area can be made narrower than the cases in FIG. 9 and FIG. 10. As a result, the probability that the exposure spot erroneously lands on the shift area is made low.

Figure 17:
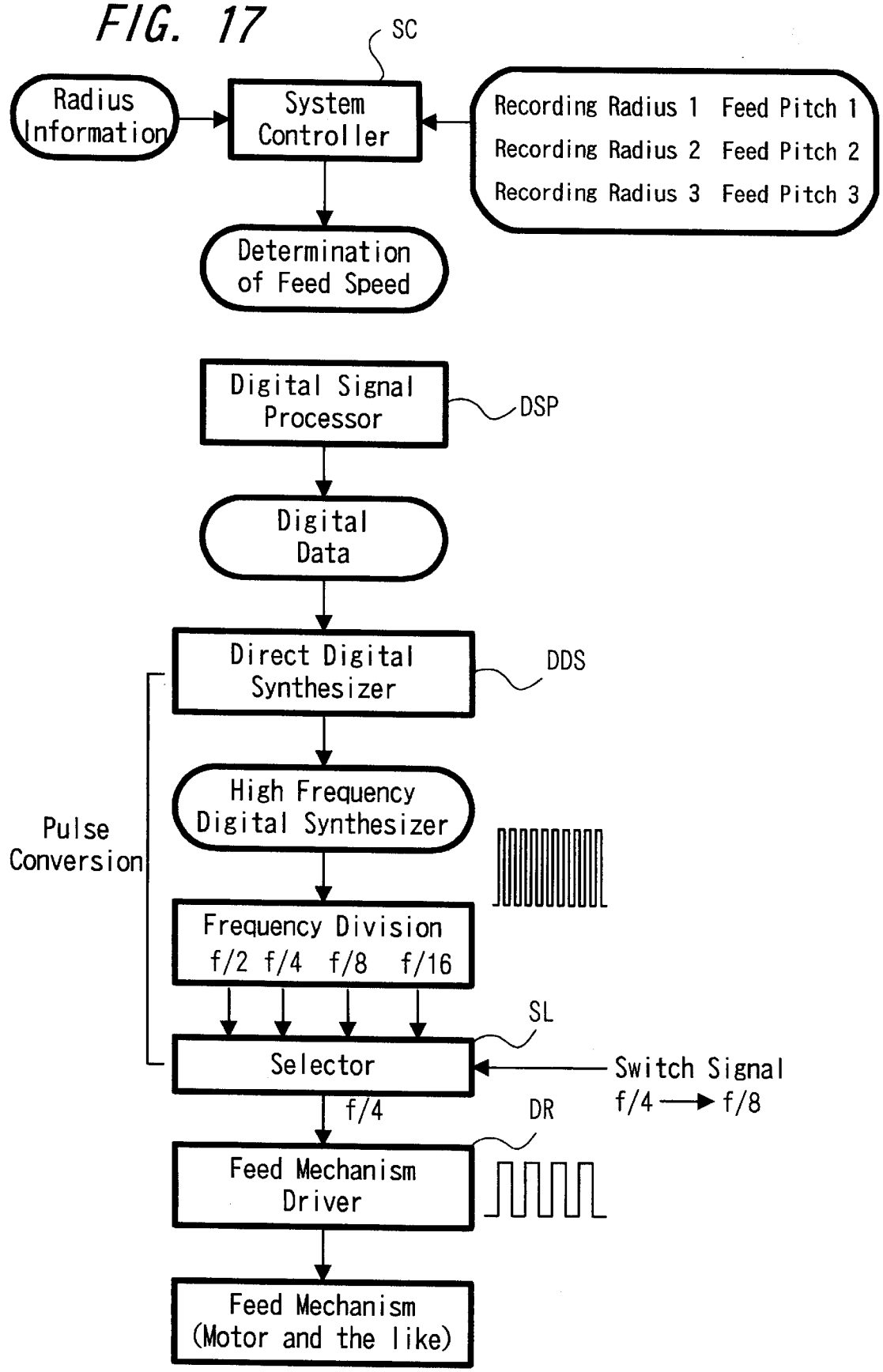
FIG. 17 is a block diagram showing an example of a system structure on a feed mechanism control system in the cutting machine according to the present invention.

By the way, a control system of the feed mechanism of the current cutting machine has, as an example, a following systematic structure. as shown in FIG. 17.

(1) Either of information of the recording linear velocity (CLV) or a number of revolution of the turntable (CAV), and information on the feed pitch are given to a system controller SC (in a case when the information on the CLV has been given, information on a recording radius is also given to the system controller) to let it calculate a feed speed of the feed mechanism from the informations.

(2) This feed speed information is given to a digital signal processor DSP to let it produce digital data of a predetermined bit (for example, 24 bits). By increasing the number of the bit, the feed speed can be set finely. Also, when the feed speed is calculated by using the CLV information and the recording radius information, the feed speed varies depending on the recording radius, but, even in the case, by increasing the number of the bit it becomes possible to control the feed speed in high precision.

(3) The digital data is given to a direct digital synthesizer to convert the data to a pulse signal of a frequency depending on the feed speed.

(4) The pulse signal is given to a feed mechanism driver DR to activate the feed mechanism (a motor and the like) at a feed speed corresponding to the frequency of the pulse signal.

Then, in order to change the feed pitch while the cutting is being carried out, as shown in FIG. 17, there should preferably be a system structure in which a program is so incorporated that, in a stage of the above-mentioned (1), a plurality of feed pitch informations and a plurality of corresponding recording radius information are given to a system controller SC.

Alternatively, in cases wherein it is possible for a change in the feed pitch p to be limited to numbers which are power times as large as two (2p, 4p, . . . ) or numbers which are inverse number times of power times as large as two (p/2 , p/4, . . . ), at the above-mentioned stage (3), as shown in FIG. 17, after firstly generating a high frequency pulse signal with a frequency f in order to improve resolution, frequency-dividing the same to generate pulse signals of frequencies f/2, f/4, f/8, f/16 and so on, the pulse signals to be supplied to a driver DR can preferably be changed over in accordance with the recording radius by supplying these signals to a selector SL as well as letting selection by the selector SL change over depending on the recording radius. In FIG. 17, such a state is shown in which at present a pulse signal with a frequency f/4 is supplied to the driver DR and a signal is supplied to the selector SL for changing over its selection to a pulse signal with the frequency f/8.

Further, in the above embodiments, the present invention is applied to the optical disk, but it is preferably applied to other optical recording media (for example, an optical card and the like).

Also, the present invention is not limited to the embodiments mentioned so far, but as a matter of course, can employ various other structures without departing from the spirit or scope of the present invention.

As mentioned so far, according to the present invention, as there exists the reproduction only area forming the single structured track consisting of pit rows other than the data recording area the forming double spiral structured track consisting of the groove and the land, it becomes possible to beforehand record the inherent information on the format and other various kinds of information in the reproduction only area.

Also, in a case wherein the track pitch in the reproduction only area is made to be narrower than two times the track pitch in the data recording area, i.e., the feed pitch of the exposure spot at a time of forming the latent image of the single spiral track in the reproduction only area is made to be narrower than the feed pitch to form the latent image of the double spiral track in the data recording area, it becomes possible to respectively improve the recording densities of the data recording area as well as the reproduction only area without being subjected to restrictions by mutual formats and The an interchangeability with the reproduction only recording media is presented.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A manufacturing method for an optical recording medium including a process for forming a photo-sensitive layer on a master, a process for forming a latent image of a track by exposing said photo-sensitive layer to a light, a process for forming a pattern of the track on said master by developing said photo-sensitive layer, and a process for molding a substrate of an optical recording medium having a track of the same pattern, comprising the steps of:

forming a latent image of two concentric spiral tracks simultaneously in a data recording area of said optical recording medium by an exposure spot at a predetermined pitch in the exposing process; and forming a latent image of a single spiral structured track in a reproduction-only area of said optical recording medium by an exposure spot at a narrower pitch than said predetermined pitch; said single spiral structured track partially overlapping with said concentric spiral tracks to form a boundary region on said optical recording medium.

2. A manufacturing method for an optical recording medium according to claim 1, wherein each track in said data recording area is formed as a contiguous groove, and the track of said reproduction-only area is formed as a continuous pit row.

3. A manufacturing method for an optical recording medium according to claim 1, wherein the pitch of the exposure spot is changed at said boundary region between a place wherein the latent image in said data recording area is formed and a place wherein the latent image in said reproduction-only area is formed.

* * * * *